(12) United States Patent
Wells et al.

(10) Patent No.: US 6,643,374 B1
(45) Date of Patent: Nov. 4, 2003

(54) DUTY CYCLE CORRECTOR FOR A RANDOM NUMBER GENERATOR

(75) Inventors: Steven E. Wells, El Dorado Hills, CA (US); David A. Ward, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/283,096

(22) Filed: Mar. 31, 1999

(51) Int. Cl.[7] .................................................. H04L 9/26
(52) U.S. Cl. ........................ 380/47; 708/250; 708/254
(58) Field of Search ..................... 380/47, 46; 708/251, 708/256, 253, 255

(56) References Cited

U.S. PATENT DOCUMENTS

| | | | |
|---|---|---|---|
| 3,706,941 A | * 12/1972 | Cohn | .......................... 331/78 |
| 3,790,768 A | 2/1974 | Chevalier et al. | |
| 4,355,366 A | * 10/1982 | Porter | ........................ 364/717 |
| 4,578,649 A | 3/1986 | Shupe | |
| 4,694,412 A | 9/1987 | Domenik et al. | |
| 4,791,594 A | 12/1988 | Harney et al. | |
| 4,810,975 A | 3/1989 | Dias | |
| 4,855,690 A | 8/1989 | Dias | |
| 5,007,087 A | * 4/1991 | Bernstein et al. | ............. 380/46 |
| 5,473,692 A | 12/1995 | Davis | |
| 5,539,828 A | 7/1996 | Davis | |
| 5,568,552 A | 10/1996 | Davis | |
| 5,627,775 A | 5/1997 | Hong et al. | |
| 5,706,218 A | 1/1998 | Hoffman | |
| 5,778,070 A | 7/1998 | Mattison | |
| 5,781,458 A | * 7/1998 | Gilley | .................. 364/717.06 |
| 5,805,712 A | 9/1998 | Davis | |
| 5,828,753 A | 10/1998 | Davis | |
| 5,835,594 A | 11/1998 | Albrecht et al. | |
| 5,844,925 A | 12/1998 | Dent | |
| 5,844,986 A | 12/1998 | Davis | |
| 5,987,483 A | * 11/1999 | Edelkind et al. | ............ 708/250 |
| 6,026,016 A | 2/2000 | Gafken | |
| 6,061,702 A | 5/2000 | Hoffman | |
| 6,104,811 A | 8/2000 | Aiello et al. | |
| 6,195,433 B1 | 2/2001 | Vanstone et al. | |
| 6,209,098 B1 | 3/2001 | Davis | |

FOREIGN PATENT DOCUMENTS

| | | |
|---|---|---|
| DE | 4006251 C1 | 4/1991 |
| WO | WO 00/59153 A2 | 10/2000 |
| WO | WO 00/59153 A3 | 1/2001 |

OTHER PUBLICATIONS

Schneier, "Applied Cryptography," 2nd Edition, Oct. 1985, John Wiley & Sone, pp. 28–29, 31–34, and 398–400.*
Michael Gude, "Concept for a High Performance Random Number Generator Based on Physical Random Phenomena," Frenquz, vol. 39, 1985, pp. 187–190.*
S. Wolfram, "Random Sequence Generation by Cellular Automata," Advances in Applied Mathematics, vol. 7, Jun. 1986, pp. 123–169.*

(List continued on next page.)

Primary Examiner—Gilberto Barron
Assistant Examiner—Paul E. Callahan
(74) Attorney, Agent, or Firm—Blakely, Sokoloff, Taylor & Zafman LLP (57) ABSTRACT

A method and apparatus for producing a corrected bit stream from a random bit stream output by a random bit source. Sequential pairs of bits in the random bit stream are compared. If both bits in a pair of bits are identical, the output bits are discarded. If both bits in a pair of bits are different, one bit of the pair of bits is taken as the output bit.

16 Claims, 7 Drawing Sheets

OTHER PUBLICATIONS

International Search Report mailed Sep. 21, 2000 for PCT application No. PCT/US00/06916 (7 pages).

Blum, M., "Independent Unbiased Coin Flips from a Correlated Biased Source—A Finite State Markov Chain," Combinatorica, vol. 6, No. 2, pp. 97–108 (1986).

Chor, Benny, et al., "Unbiased Bits from Sources of Weak Randomness and Probabilistic Communication Complexity," SIAM Journal on Computing, vol. 17, No. 2, pp. 230–261 (Apr. 1988).

Cooper, J. Arlin, Computer Security, pp. 2072–2086 (Published prior to Mar. 31, 1999).

Fairfield, R.C., et al., "An LSI Random Number Generator (RNG)," published in Proceedings in Advances in Cryptology Conference on CRYPTO, pp. 203–215 (1984).

Gude, Michael, "Concept for a High Performance Random Number Generator Based on Physical Random Phenomena," Frequenz, 39, pp. 187–190 (Jul./Aug. 1985).

Murry, Herschell F., "A General Approach for Generating Natural Random Variables," IEEE Transacations on Computers, pp. 1210–1213 (Dec. 1970).

Santha, Miklos, et al., "Generating Quasi–Random Sequences from Slightly–Random Sources," Proceedings of the 25th Annual Symposium on Foundations of Computer Science, pp. 434–440 (Oct. 24–26, 1984).

Santha, Miklos, et al., "Generating Quasi–random Sequences from Semi–random Sources," Journal of Computer and System Sciences, vol. 33, No. 1, pp. 75–87 (Aug. 1986).

von Neumann, John, "Various Techniques Used in Connection With Random Digits," Applied Mathematics Series, vol. 12, United States Department of Commerce, National Bureau of Standards, pp. 36–38 (Jun. 11, 1951).

Shift Registers, pp. 1725–1727 (published prior to Mar. 31, 1999).

U.S. patent applications No. 09/283,769, filed Mar. 31, 1999, entitled "Programmable Random Bit Source", by Steven E. Wells.

Schneier, Bruce, Applied Cryptography, John Wiley & Sons, Inc., pp. vii–xiv and 369–395 (2nd Ed., 1996).

* cited by examiner

DUTY CYCLE CORRECTOR FOR A RANDOM NUMBER GENERATOR

FIELD OF THE INVENTION

The present invention relates generally to computer security, and more specifically to generating an approximately uniform duty cycle in a random number generator.

BACKGROUND OF THE INVENTION

Random number generator circuits are used in a variety of electronic applications. One important application for random number generators is in the field of computer security where message data is encrypted and decrypted. Cryptography involves the transformation of data into a coded message that is to be sent to and decoded only by the intended recipient. Most common cryptographic techniques use ciphers (or "keys") used by the sender to encode the message and by the receiver to decode the encoded message. Common cipher systems use either a single key, one to code and decode a message, or two keys, one to encode the message and the other to decode the message.

The keys used to encode and decode messages are basically binary data patterns against which a message is processed or filtered. Effective cipher systems require the use of keys that have a sufficiently high number of bits to make replication of a key nearly impossible. Furthermore, the data patterns comprising the keys must be sufficiently random so that their pattern or the patterns in the message encoded by the key cannot be predicted. Effective cryptographic systems thus require the use of high quality random number generators to ensure that the binary data within a message is transformed in a totally unpredictable manner. In general, any lack of randomness in an encryption scheme produces some degree of correlation between the coded and uncoded data. This correlation can then be used crack the code through techniques such as iterative trial and error predictions of possible output patterns based on a coded message.

A desirable feature of a binary random number generator is that it output one and zero bits in a purely random order. Thus, the value of the output bit at any given time should be totally unpredictable. It is desirable that the duty cycle of the output of the random number generator be approximately fifty percent over an infinite sample size, so that the chance of an output being a logic low (zero) is equal to the chance of the output being a logic high (one). It is also desirable for a random number generator to exhibit low correlation (e.g., approximately zero correlation) between any bit and any other bit, and a flat Fourier distribution among the output bits.

Present known random number generators, however, have a tendency to generate an uneven number of zeros or ones over a statistically significant sample size. A common reason for prior art random number generators to exhibit an unequal duty cycle is that the latches comprising the random number generator typically favor one of the two states if data is latched during a forbidden setup/hold time. A common present method of decreasing duty cycle variations in random number generators involves the use of a Linear Feedback Shift Register (LFSR) at the output stage of a random bit source.

Figure 1:
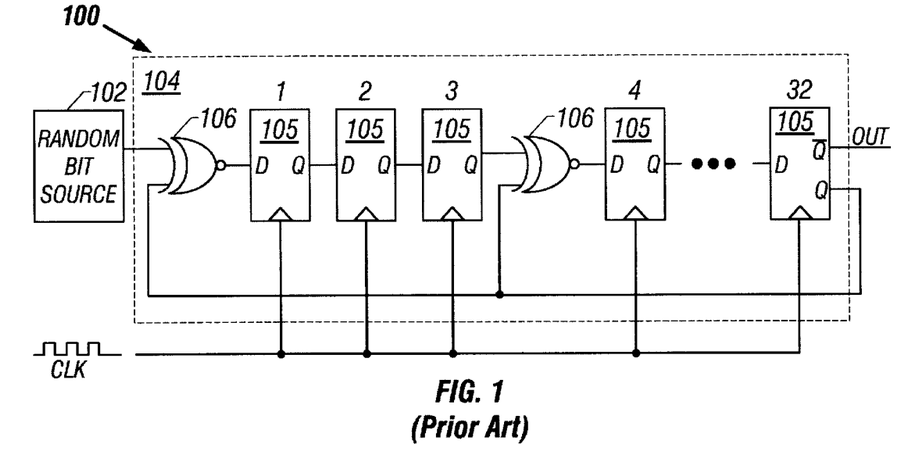
FIG. 1 is a conventional random number generator using a Linear Feedback Shift Register.

FIG. 1 illustrates an example of a prior art random number generator that uses a Linear Feedback Shift Register 104 coupled to the output of a random bit source 102. LFSR 104 comprises a number of latches 105 and gates 106 through which the output bits from random bit source 102 are propagated. The states of the output bits are randomly inverted by gates 106, and the order of the bits is further mixed up through feed-back of the bits through latches 105.

In general, Linear Feedback Shift Registers, such as that illustrated in FIG. 1 possess certain disadvantages and do not fully correct non-level duty cycle characteristics exhibited by typical random bit sources. As illustrated by. LFSR 104, a typical LFSR itself comprises a number of latches and gates. These latches and gates will tend to exhibit the same propensity to latch a zero or one in certain circumstances, as the latches in the random bit source 102. Therefore, a typical LFSR does not itself produce a uniform duty cycle output of ones and zeros, and thus cannot entirely correct any duty cycle variations in a random bit source.

A further disadvantage of Linear Feedback Shift Registers is the requirement of a large number of latches and gates. For example, a 32-bit LFSR, such as shown in FIG. 1, requires 32 D-type latches, as well as a number of combinatorial gates. This adds significantly to the amount of silicon area required for a random number generator circuit that uses such an LFSR.

SUMMARY OF THE INVENTION

A method and apparatus is disclosed for producing a corrected bit stream from a random bit stream output by a random bit source. Sequential pairs of bits in the random bit stream are compared. If both bits in a pair of bits are identical, the output bits are discarded. If both bits in a pair of bits are different, one bit of the pair of bits is taken as the output bit.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A duty cycle corrector for use in a random number generator is described. In one embodiment, sequential pairs of bits output from the random bit source are processed by the duty cycle corrector. If both bits in a pair of bits are identical, the duty cycle corrector discards or does not output the pair of bits. If the bits in a pair of bits are different, the duty cycle corrector outputs one of the bits in the bit pair.

It is an intended advantage of embodiments of the invention to provide a circuit that produces an approximately uniform duty cycle for the output of a random bit source. It is a further intended advantage of embodiments of the invention to provide a random number generator that requires a reduced amount of silicon area when implemented in an integrated circuit device.

Recall that a random bit source is a digital circuit that outputs a series of binary digits in a presumably random order. In an ideal random bit source, the probability that a given output bit will be a zero is equal to the probability that it will be a one. That is, the duty cycle of the output waveform of the random bit source will be uniformly fifty percent over a statistically significant sample size. However, most random bit sources exhibit some variation in duty cycle due to a tendency of latches and gates within random bit source to latch to a particular logic level when data is latched during a forbidden hold or setup time.

The probability that a given bit will be output at a particular time by a random bit source can be expressed by certain mathematical relationships. For example, if the probability that the output will be a zero ($P(0)$) is p, then the probability that the output will be a one ($P(1)$) is $1-p$. That is, Probability of generating a zero: $P(0)=p$ Probability of generating a one: $P(1)=1-p$ For an ideal random bit source p is 50 percent. For non-ideal random bit source, p may be substantially greater than or less than 50 percent.

If sequential output bits of the random bit source are considered in pairs, the probabilities become:

Probability of generating a zero, zero: $P(00)=P(0)P(0)=p^2$

Probability of generating a zero, one: $P(01)=P(0)P(1)=p(1-p)$

Probability of generating a one, zero: $P(10)=P(1)P(0)=(1-p)p$

Probability of generating a one, one: $P(11)=P(1)P(1)=(1-p)^2$

Mathematically, the probabilities of generating either a 0, 1 output pair or a 1, 0 output bit pair are equal, as can be seen in the above probability equations. That is, since $p(1-p)=(1-p)p$, then $P(01)=P(10)$.

This property is true regardless of the probability of the random bit source producing a one or zero for any given output. Thus, even if p does not equal 50 percent for a particular random bit source, the probability that the random bit source will produce a zero-one output pair is equal to the probability that it will produce a one-zero output pair. In one embodiment of the present invention, this principle is used to correct the output of a random bit source that exhibits a non-uniform duty cycle and generates an unequal distribution of zeros and ones in a given output bit stream.

In one method of the present invention, a duty cycle corrector processes bit pairs output from a random bit source to determine a corrected, substantially uniform bit stream. In one embodiment, if both bits in a pair of bits are identical, then that pair is discarded and not output by the duty cycle corrector as part of the corrected bit stream. Thus, if both bits in a pair of output bits are zero, this pair is discarded. Likewise, if both bits in a pair of output bits are one, this pair is discarded. If, however, the bits in a pair of output bits are different, the duty cycle corrector outputs one of the bits in the pair as a bit in the corrected bit stream. In one embodiment, the duty cycle corrector outputs the first bit in a dissimilar pair of bits as the corrected bit. Thus, for this embodiment, if the output pair is zero-one, the corrected bit is set to zero; and if the output pair is one-zero, the corrected bit is set to one. The corrected bit values corresponding to the various paired cases can be represented by the following relationships:

| | |
|---|---|
| $P(00) = P(0)P(0) = p^2$ | Rejected Case |
| $P(01) = P(0)P(1) = p(1-p)$ | Logical 0 output |
| $P(10) = P(1)P(0) = (1-p)p$ | Logical 1 output |
| $P(11) = P(1)P(1) = (1-p)^2$ | Rejected Case |

In an alternative embodiment, the duty cycle corrector outputs the second bit in a dissimilar pair of bits as the correct bit. Thus, for this embodiment, if the output pair is zero-one, the corrected bit is set to one; and if the output pair is one-zero, the corrected bit is set to zero. The corrected bit values corresponding to the various paired cases for this alternative embodiment can be represented by the following relationships:

| | |
|---|---|
| $P(00) = P(0)P(0) = p^2$ | Rejected Case |
| $P(01) = P(0)P(1) = p(1-p)$ | Logical 1 output |
| $P(10) = P(1)P(0) = (1-p)p$ | Logical 0 output |
| $P(11) = P(1)P(1) = (1-p)^2$ | Rejected Case |

Figure 2:
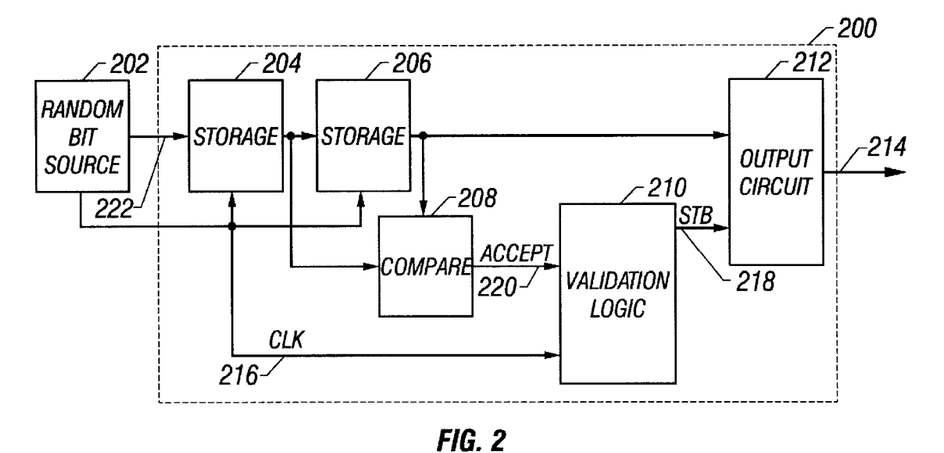
FIG. 2 is a block diagram of a random bit source and one embodiment of a duty cycle corrector.

FIG. 2 shows one embodiment of a duty cycle corrector 200 that implements the embodiments described above to produce a substantially uniform bit stream from a random bit source 202 while using fewer gates than previous LFSR circuits. Random bit source 202 may be any random bit source that outputs a random stream of bits to signal line 222. In one embodiment of the present invention, random bit source 202 is implemented as a latch circuit that uses a randomly varying low speed clock signal to periodically latch a high speed oscillating signal. The value of the output bit from the random bit source latch depends on the voltage level of the high speed signal when it is latched by the low speed signal. Random bit source 202 may also generate a clock or strobe signal CLK on signal line 216 as generally known in the art.

Duty cycle corrector 200 includes storage elements 204 and 206, compare circuit 208, validation logic 210, and an output circuit 212. Storage circuits 204 and 206 store pairs of successive bits in the random bit stream output from random bit source 202 for comparison by compare circuit 208. In a first clock cycle of CLK, the first bit in a pair of bits is stored in storage circuit 204. In a later clock cycle, the first bit is stored in storage circuit 206 while the next bit output from random bit source 202 is stored in storage circuit 204. Storage circuits 204 and 206 may be any type of storage elements including latches, registers, volatile or non-volatile memory cells, and the like.

The bits stored in storage circuits 204 and 206 are compared by compare circuit 208. Compare circuit 208 may be any type of compare circuit including an XOR gate or a comparator. If both bits are equal, compare circuit 208 asserts the ACCEPT signal on signal line 220 to a high logic state. If both bits are not equal, however, compare circuit 208 deasserts the ACCEPT signal to a low logic state. Thus, the ACCEPT signal indicates whether the pair of bits output from the random bit source will generate a corrected bit in the bit stream output by duty cycle corrector 200.

The ACCEPT signal is provided to validation logic 210 together with CLK. Compare circuit 208 will assert ACCEPT when any two successive bits in storage circuits 204 and 206 are different bits. It is advantageous, however, to compare non-overlapping pairs of bits output from random bit source 202 in order to produce a uniform duty cycle output stream from duty cycle corrector 200. Validation logic 210 performs this function. Validation logic 210 asserts the strobe signal STB to a high logic state on signal line 218 when ACCEPT is asserted and the desired bit pair is stored in storage circuits 204 and 206. When STB is asserted, output circuit 212 stores the bit in storage circuit 206. Output circuit 212 may be any storage element including a register, a latch, one or more volatile or nonvolatile memory elements, an AND gate, or other logic. The bit stored by output circuit 212 is output to signal line 214 as the corrected bit corresponding to the bits stored in storage circuits 204 and 206.

For an alternative embodiment, the output storage circuit 204 may be provided to output circuit 212 instead of the output of storage circuit 206. For this embodiment, when STB is asserted, output circuit 212 stores the bit in storage circuit 204, and outputs this bit as the corrected bit corresponding to the bits stored in storage circuits 204 and 206.

Figure 3:
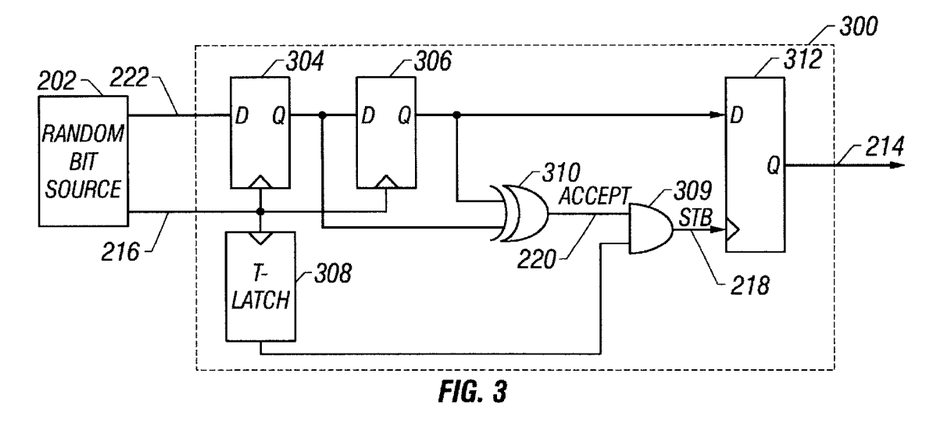
FIG. 3 is a logic diagram of one embodiment of the duty cycle corrector of FIG. 2.

FIG. 3 shows duty cycle corrector 300 that is one embodiment of duty cycle corrector 200. Duty cycle corrector 300 includes latches 304 and 306 that are one embodiment of storage circuits 204 and 206, respectively; XOR gate 310 that is one embodiment of compare circuit 210; transparent latch 308 and AND gate 312 that together comprise one embodiment of validation logic 210; and latch 312 that is one embodiment of output circuit 212.

Latches 304 and 306 latch pairs of successive bits from random bit source 202 for comparison by XOR gate 310. The first bit in a pair of bits is latched in latch 304 by CLK. On the next clock pulse of CLK, this first bit is latched in latch 306, and the next bit output from random bit source 202 is latched in latch 304. If both bits in a bit pair are equal, XOR gate 310 deasserts ACCEPT to a zero; if both bits in a bit pair are not equal, XOR gate 310 asserts ACCEPT to a one.

Transparent latch 308 latches CLK from random bit source 302 for clocking the AND gate 309 such that STB will be asserted only when ACCEPT is asserted and a non-overlapping bit pair is stored in latches 304 and 306. When STB is asserted, latch 312 latches the bit output from latch 306 as the corrected bit output on signal line 214. In an alternative embodiment, the output of latch 304 may be provided to latch 312. This bit may be latched by latch 312 in response to STB.

Figure 4:
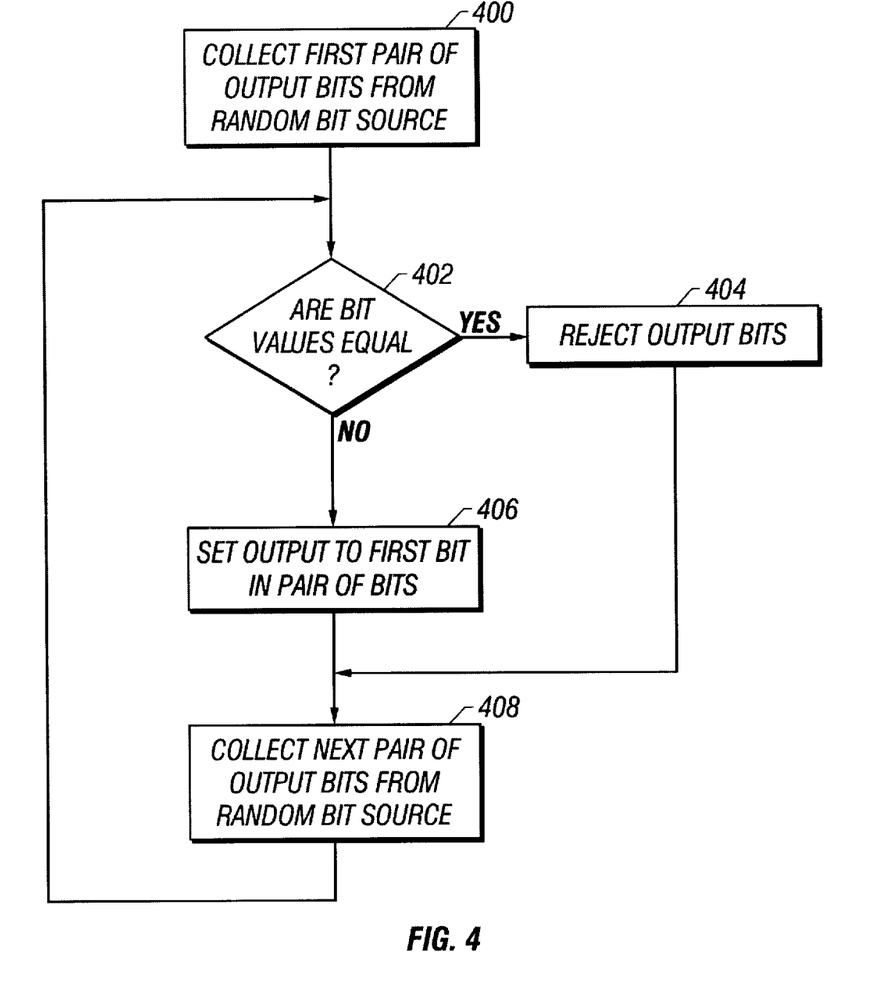
FIG. 4 is flow chart illustrating the operation of the duty cycle corrector of FIG. 2.

FIG. 4 is a flowchart that illustrates the operation of duty cycle corrector 300. At step 400, a first pair of bits from random bit source 202 are latched into latches 304 and 306 with the first bit stored in latch 306 and the second bit stored in latch 304. At step 402, XOR gate 310 determines if the two bits of the pair are equal. If the pair of bits are equal at step 204, ACCEPT is deasserted, STB is deasserted, and the bit pair is rejected or discarded. At step 204, neither bit is latched by latch 312 and output to signal line 214. If, however, the two bits are determined to be different from one another at step 402, the first bit is taken as the output bit at step 406.

At step 408, the next overlapping pair of bits from random bit source 202 are collected, and the process repeats from step 402. This process repeats until all output bit pairs from the random bit source have been processed. Any output bits from the random number source that are unpaired cannot be processed and are thus rejected. It should be noted that although the first bit of the pair from latch 306 is supplied as the corrected bit, in an alternative method, the second bit of the pair from latch 304 is supplied as the corrected bit.

Figure 5:
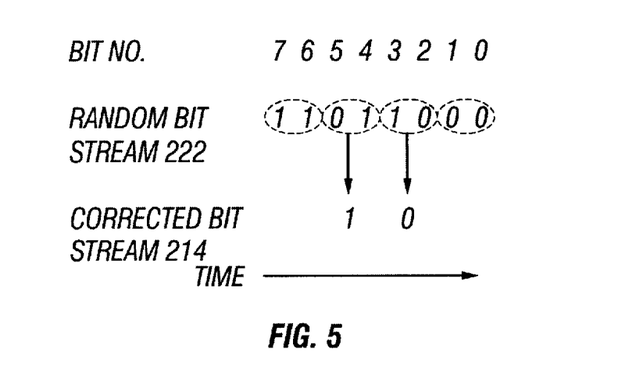
FIG. 5 illustrates an example of the corrected bit pattern generated by the duty cycle corrector of FIG. 3.

A further illustration of the operation of duty cycle corrector 300 is shown in FIG. 5. FIG. 5 shows that the second bit pair (bits 2 and 3) and the third bit pairs (bits 4 and 5) generate corrected bits, while the first bit pair (bits 0 and 1) and the fourth bit pair (bits 6 and 7) do not.

Random bit source 202 may output bits that have a first order autocorrelation between successively generated bits due to the nature of latches, logic gates, and other circuit elements. Thus, even though a duty cycle corrector, such as those shown above in FIGS. 2 and 3, may be able to output substantially a random bit pattern having a substantially uniform duty cycle, the likelihood that the output of the duty cycle corrector is closer to a uniform duty cycle increases if the autocorrelation between bits output by the random bit source is lower. That is, the likelihood that the output of the duty cycle corrector is closer to a uniform duty cycle increases if the bits in the random bit stream are unrelated to each other.

Figure 6:
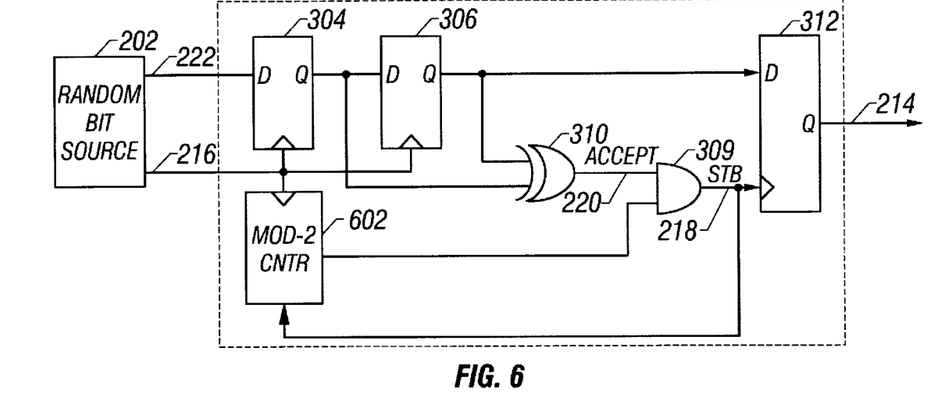
FIG. 6 is a logic diagram of another embodiment of the duty cycle corrector of FIG. 2.

As shown in FIG. 5, duty cycle corrector 300 of FIG. 3 may be affected by first order autocorrelation between the bits in the random bit stream output by random bit source 202 as duty cycle corrector 300 operates on consecutive bit pairs. FIG. 6 shows another embodiment of a duty cycle corrector 600 that reduces the affect of first order autocorrelation between bits pairs output by random bit source 202. Duty cycle corrector 600 reduces first order autocorrelation by discarding a bit from random bit source 202 once a bit pair is detected that generates a corrected bit.

Figure 7:
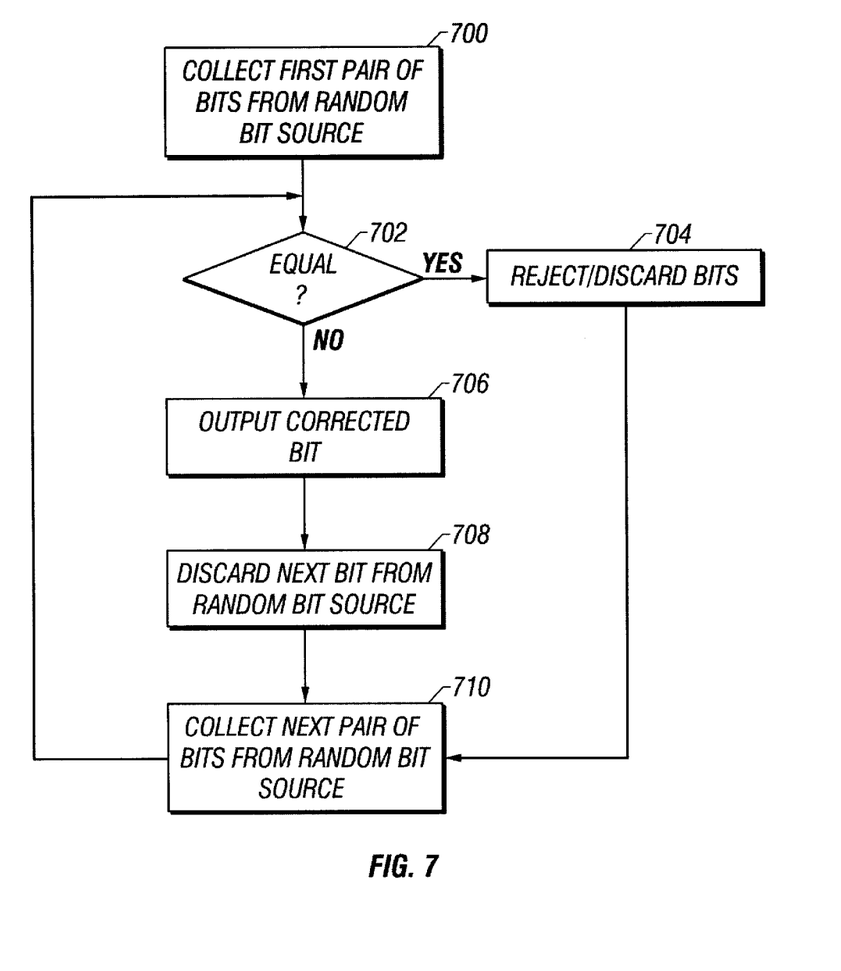
FIG. 7 is flow chart illustrating the operation of the duty cycle corrector of FIG. 6.

Duty cycle corrector 600 is similar to duty cycle corrector 300, except that transparent latch 308 of the validation logic has been replaced with modulo-2 counter 602. The operation of duty cycle corrector 600 is illustrated in FIG. 7. At step 700, a first pair of bits from random bit source 202 are latched into latches 304 and 306 on counts 0 and 1 of modulo-2 counter 602. At step 702, XOR gate 310 determines if the two bits of the pair are equal. If the pair of bits are equal at step 704, ACCEPT is deasserted, STB is deasserted, and the bit pair is rejected or discarded. At step 704, neither bit is latched by latch 312 and output to signal line 214. If the bits do not match at step 702, at step 704 ACCEPT is asserted on count 1, STB is asserted, and the first bit (or, alternatively, the second bit) is output by output by latch 312. STB is also fed back to modulo-2 counter 602 such that when STB is asserted modulo-2 counter 602 skips a count and holds the next two clock cycles low (i.e., both count 0). This will cause, at step 807, duty cycle corrector 600 to discard the next bit in the random bit stream from random bit source 202. This occurs because even though the next bit is loaded into latch 304, it will be clocked through latch 306 before the next time that modulo-2 counter 602 will output count 1 to AND gate 309. At step 708, the next overlapping pair of bits from random bit source 202 are collected, and the process repeats from step 702. This process repeats until all output bit pairs from the random bit source have been processed.

Figure 8:
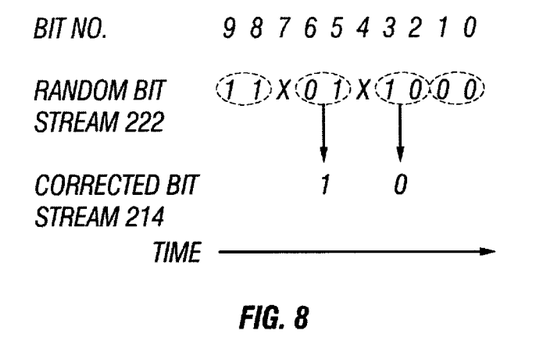
FIG. 8 illustrates an example of the corrected bit pattern generated by the duty cycle corrector of FIG. 6.

A further illustration of the operation of duty cycle corrector 600 is shown in FIG. 8. When the first bit pair (bits 0 and 1) are equal, the bits are discarded and no corrected bit is generated for this bit pair. Additionally, STB will not be asserted and modulo-2 counter 602 will not skip a count. The second bit pair (bits 2 and 3) are not equal and duty cycle corrector 600 outputs a zero, and then causes the next bit, bit 4, to be discarded because modulo-2 counter 602 skips a count. The third bit pair (bits 5 and 6) are also not equal. Duty cycle corrector 600 outputs a one and causes the next bit, bit 7, to be discarded because modulo-2 counter 602 skips a count. The last bit pair (bits 8 and 9) are equal and are discarded.

The discarding of bits 4 and 7 will reduce the first order autocorrelation between the second bit pair (bits 2 and 3) and the third bit pair (bits 5 and 6), and between the third bit pair and the fourth bit pair (bits 8 and 9). The corrected bit stream will be influenced by a less significant second order autocorrelation between the second bit pair and the third bit pair, and between the third bit pair and the fourth bit pair output by random bit source 202.

Duty cycle corrector 600 reduces the first order autocorrelation between bits generated by the random bit source. It may, however, tend to introduce a non-uniformity in the duty cycle of the corrected bit stream as the singular discarded bits (e.g., bits 4 and 7 of FIG. 8) may not be evenly distributed in the random bit stream.

Figure 9:
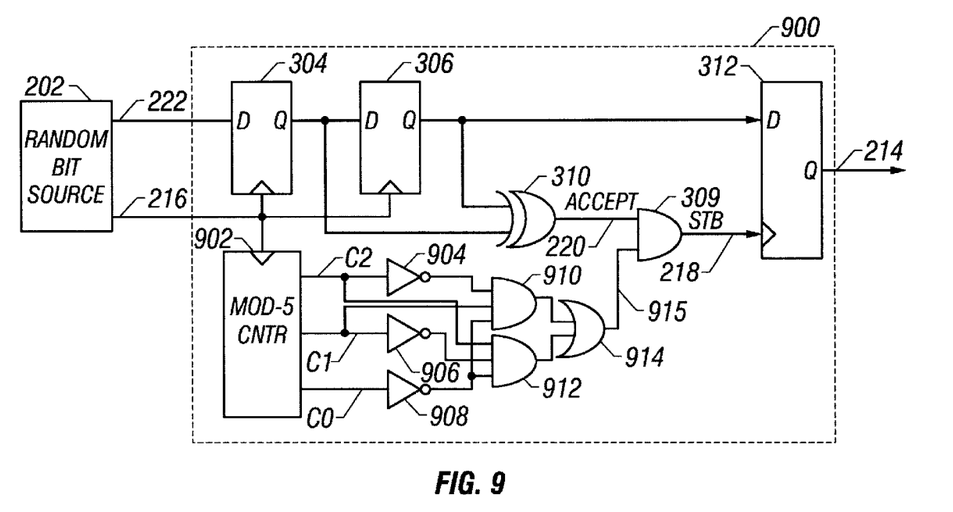
FIG. 9 is a logic diagram of one embodiment of the duty cycle corrector of FIG. 2.

FIG. 9 shows another embodiment of a duty cycle corrector 900 that reduces the affect of first order autocorrelation between bits pairs output by random bit source 202. Duty cycle corrector 900 reduces first order autocorrelation by discarding bits from random bit source 202 that are shifted in on particular counts of a modulo-5 counter.

Duty cycle corrector 900 is similar to duty cycle corrector 300, except that transparent latch 308 of the validation logic has been replaced with modulo-5 counter 902, inverters 904, 906, and 908, AND gates 910 and 912, and NOR gate 914. Modulo-5 counter 902 has three binary output bits C0, C1, and C2. AND gate 910 is a three-input AND gate that has a first input coupled C2 via inverter 904, a second input coupled to C1, and a third input coupled to C0 via inverter 908. AND gate 912 is a three-input AND gate that has a first input coupled to C2, a second input coupled to C1 via inverter 906, and a third input coupled to C0 via inverter 908. NOR gate 914 receives the outputs of AND gates 910 and 912, and drives one input of AND gate 309.

Figure 10:
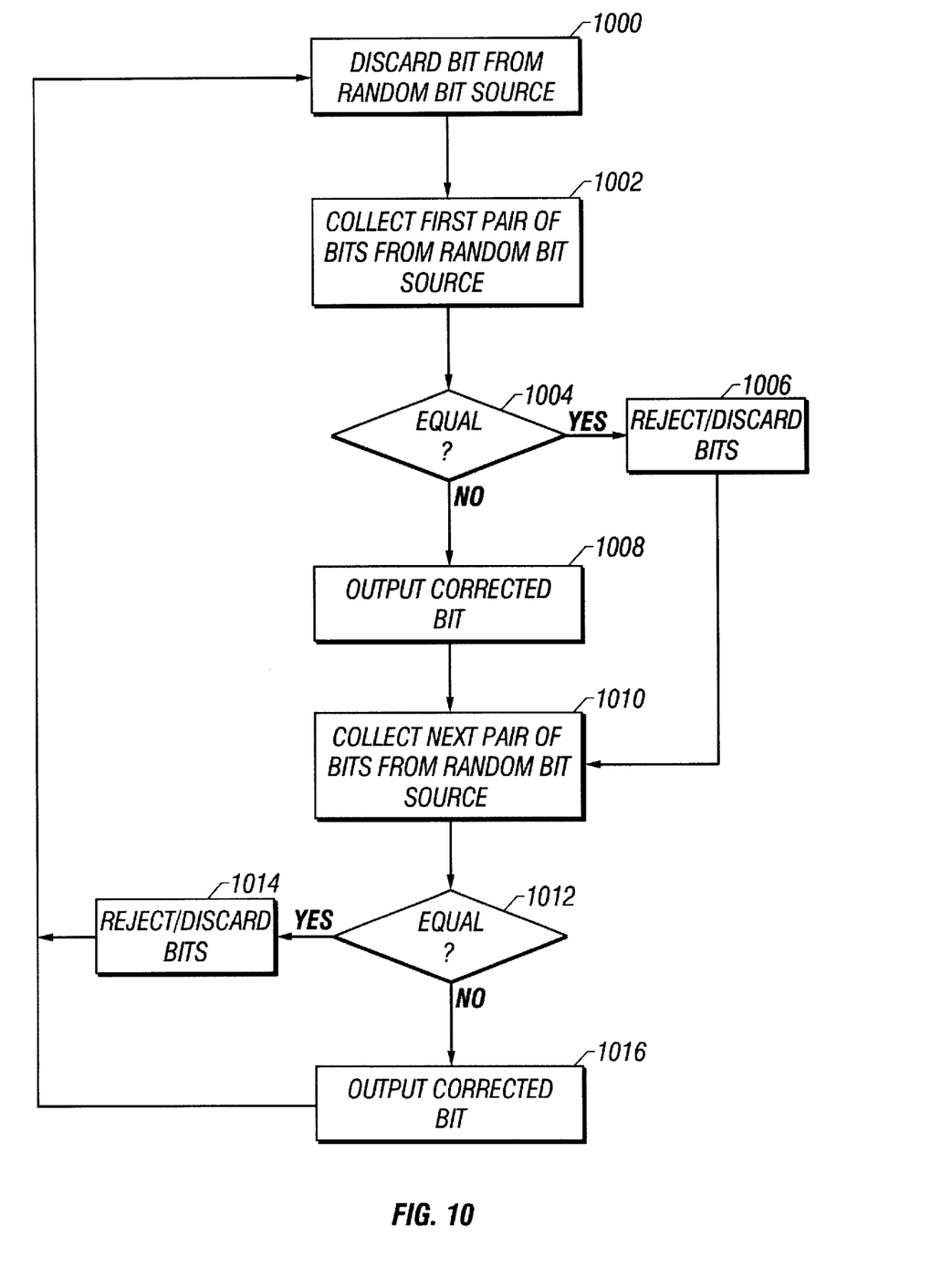
FIG. 10 is flow chart illustrating the operation of the duty cycle corrector of FIG. 10.

The operation of duty cycle corrector 900 is illustrated in FIG. 10. At step 1000 and count 0 of modulo-5 counter 902, a first bit is loaded into latch 304. This bit will be discarded because the signal on signal line 915 will not be asserted for counts 0 and 1. At step 1002, a first pair of bits from random bit source 202 is latched into latches 304 and 306 on counts 1 and 2. This will cause the first bit to be discarded from corrector 1000. At step 1004 and count 2, XOR gate 310 determines if the two bits of the pair are equal. If the pair of bits are equal, then at step 1006 ACCEPT is deasserted, STB is deasserted, and the bit pair is rejected or discarded. At step 1006, neither bit is latched by latch 312 and output to signal line 214. If the bits do not match at step 1004 and count 2, then at step 1008 ACCEPT is asserted, STB is asserted, and the first bit (or, alternatively, the second bit) is output by latch 312.

At step 1010, a second pair of bits from random bit source 202 is latched into latches 304 and 306 on counts 3 and 4. At step 1012 and count 4, XOR gate 310 determines if the two bits of the pair are equal. If the pair of bits are equal, then at step 1014 ACCEPT is deasserted, STB is deasserted, and the bit pair is rejected or discarded. If the bits do not match at step 1012 and count 4, then at step 1016 ACCEPT is asserted, STB is asserted, and the first bit (or, alternatively, the second bit) is output by output by latch 312. This process repeats until all output bit pairs from the random bit source have been processed.

Figure 11:
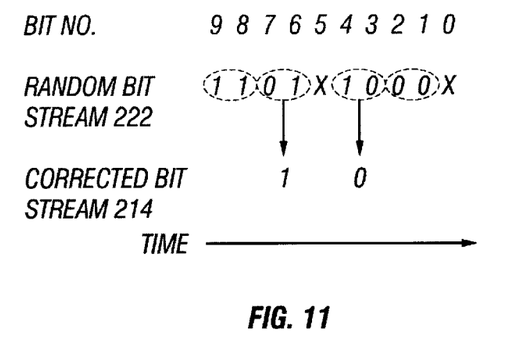
FIG. 11 illustrates an example of the corrected bit pattern generated by the duty cycle corrector of FIG. 9.

A further illustration of the operation of duty cycle corrector 900 is shown in FIG. 11. The first bit, bit 0, is loaded into corrector 900, but will be discarded when the first bit pair is loaded. When the first bit pair (bits 1 and 2) are equal, the bits are discarded and no corrected bit is generated for this bit pair. The second bit pair (bits 3 and 4) are not equal and duty cycle corrector 900 outputs a zero. Modulo-5 counter 902 then returns back to count 0 such that bit 5 will eventually be discarded. The third bit pair (bits 6 and 7) are also not equal, and duty cycle corrector 900 outputs a one. The last bit pair (bits 8 and 9) are equal and are discarded.

The discarding of bits 0 and 5 will reduce the first order autocorrelation between the second bit pair (bits 3 and 4) and the third bit pair (bits 6 and 7). The corrected bit stream will be influenced by a less significant second order autocorrelation between the second and third bit pairs. The discarded bits of count 0 (count 5, count 10, etc.) are evenly distributed in the random bit stream and their exclusion may, thus, result in an approximately uniform duty cycle for the corrected bit stream.

Figure 12:
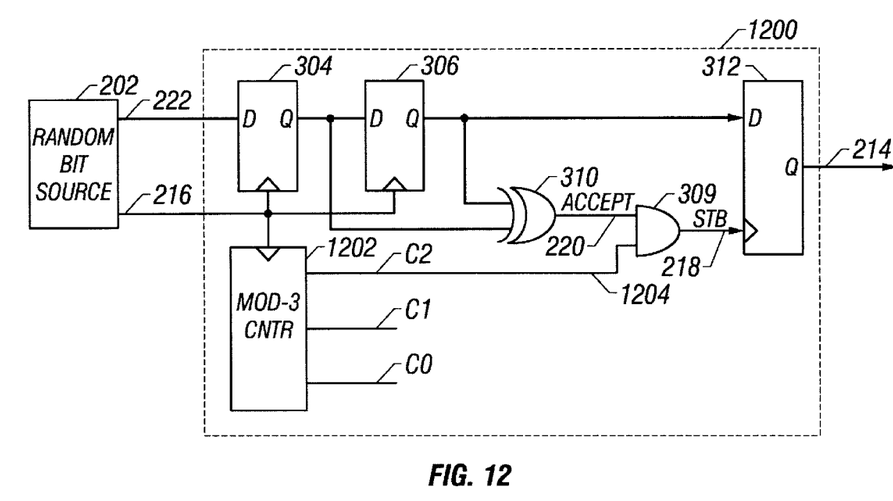
FIG. 12 is a logic diagram of one embodiment of the duty cycle corrector of FIG. 2.

FIGS. 12 shows another embodiment of a duty cycle corrector 1200 that reduces the affect of first order autocorrelation between bits pairs output by random bit source 202. Duty cycle corrector 1200 reduces first order autocorrelation by discarding bits from random bit source 202 that are between pairs of bits that are compared.

Duty cycle corrector 1200 is similar to duty cycle corrector 300, except that transparent latch 308 of the validation logic has been replaced with modulo-3 counter 1202 that has outputs a high logic signal on signal line 1204 only on count 2.

Figure 13:
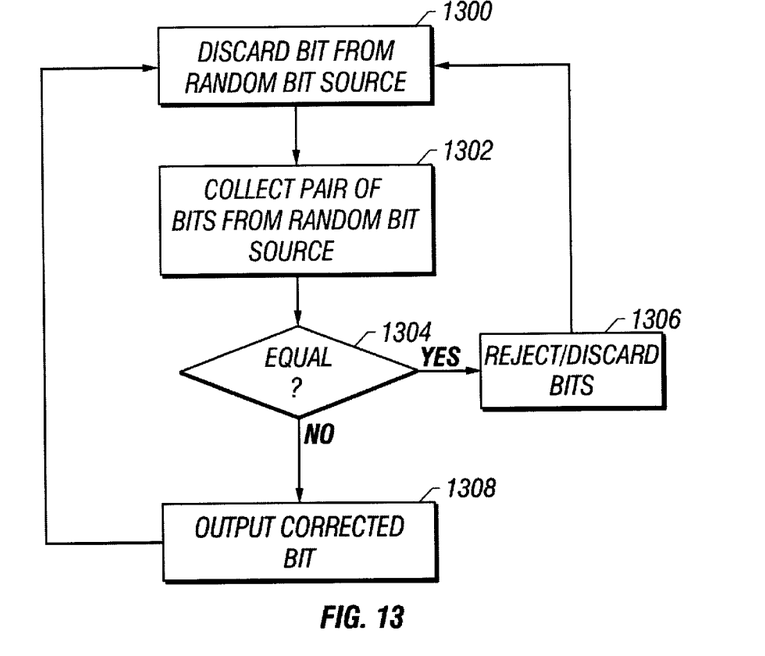
FIG. 13 is flow chart illustrating the operation of the duty cycle corrector of FIG. 12.

The operation of duty cycle corrector 1200 is illustrated in FIG. 13. At step 1300 and count 0 of modulo-3 counter 902, a first bit is loaded into latch 304. This bit will be discarded because the signal on signal line 1204 will not be asserted for counts 0 and 1. At step 1302, a first pair of bits from random bit source 202 is latched into latches 304 and 306 on counts 1 and 2. This will cause the first bit to be discarded from corrector 1200. At step 1304 and count 2, XOR gate 310 determines if the two bits of the pair are equal. If the pair of bits are equal, then at step 1306 ACCEPT is deasserted, STB is deasserted, and the bit pair is rejected or discarded. At step 1306, neither bit is latched by latch 312 and output to signal line 214. If the bits do not match at step 1304 and count 2, then at step 1308 ACCEPT is asserted, STB is asserted, and the first bit (or, alternatively, the second bit) is output by output by latch 312. This process repeats until all output bit pairs from the random bit source have been processed.

Figure 14:
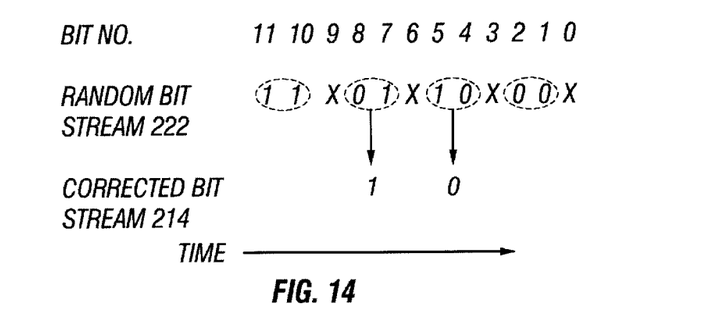
FIG. 14 illustrates an example of the corrected bit pattern generated by the duty cycle corrector of FIG. 12.

A further illustration of the operation of duty cycle corrector 1200 is shown in FIG. 14. The first bit, bit 0, is loaded into corrector 1200, but will be discarded when the first bit pair is loaded. When the first bit pair (bits 1 and 2) are equal, the bits are discarded and no corrected bit is generated for this bit pair. The fourth bit, bit 3, is loaded into corrector 1200, but will be discarded when the second bit pair is loaded. The second bit pair (bits 4 and 5) are not equal and duty cycle corrector 1200 outputs a zero. The seventh bit, bit 6, is loaded into corrector 1200, but will be discarded when the third bit pair is loaded. The third bit pair (bits 7 and 8) are not equal and duty cycle corrector 1200 outputs a one. The tenth bit, bit 9, is loaded into corrector 1200, but will be discarded when the fourth bit pair is loaded. The fourth bit pair (bits 10 and 11) are equal and are discarded.

The discarding of bits 0, 3, 6, 9, etc. will reduce the first order autocorrelation between the compared bit pairs. The corrected bit stream will be influenced by a less significant second order autocorrelation between the compared bit pairs. The discarded bits of counts 0, 3, 6, 9, etc. of modulo-3 counter 1202 are evenly distributed in the random bit stream and their exclusion may, thus, result in an approximately uniform duty cycle for the corrected bit stream.

While the duty cycle correctors illustrated above have been described as comparing two consecutive bits in the random bit stream of a random bit source, non-consecutive bits may also be compared in alternative embodiments. For example, additional storage circuits may be inserted between storage circuits 204 and 206, or each storage circuit may be clocked by different clocks or different clock edges.

Additionally, output circuit 212 has been shown to receive either the output of storage circuit 204 or 206. For an alternative embodiment, compare logic 208 may include logic that determines the data provided to output circuit 212 in response to the data stored in storage circuits 204 and 206.

Figure 15:
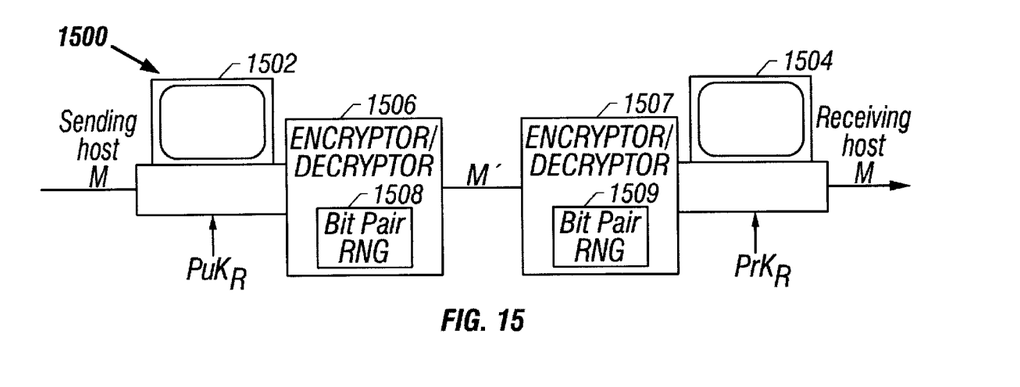
FIG. 15 is a block diagram of a computer network that uses a bit pairing system for data encryption/decryption according to an embodiment of the present invention.

The duty cycle correctors described for producing a substantially uniform distribution of ones and zeros from a random bit source may be used in conjunction with a random number generator for coding and decoding messages sent over a computer network. FIG. 15 is a block diagram of a computer network for transmitting encrypted messages using any of the embodiments described above. Network 1500 includes a sending host computer 1502 coupled to a receiving host computer 1504 over a network. Both the sending host computer and the receiving host computer contain network interface devices that provide the physical and logical connections between host computer systems and the network medium. Both host computers also contain encryptor/decryptor circuits that perform various cryptographic functions for secure data communication. Sending host 1502 includes encryptor/decryptor circuit 1506, and receiving host 1504 includes encryptor/decryptor circuit 1507. The encryptor/decryptor circuits 1506 and 1507 both include random number generators 1508 and 1509, respectively, that employ any of the embodiments of FIG. 2, 3, 6, 9, or 12. The random number generators are used to generate the public/private key pairs in public/private key systems.

Various methods of data encryption may be used in network 1500 to ensure secure communications between sending host 1502 and receiving host 1504. In one embodiment, network 1500 uses a public key (asymmetric) cryptographic system. In a public key system, two different keys are used. One key is used by the sender to encode a message and the other key is used by the receiver to decode the coded message. In this system, the encryption (public) key may be widely published, but the decryption (private) key must be kept secret so that only the intended receiver can decode the message. The public and private keys are typically derived together from very large primes and random numbers. Thus, effective random number generators are required to produce truly random key pairs.

In an example of a data transfer using a public key system, sending host 1502 composes a message M for transmission to receiving host 1504. The two keys used for the transmission comprise the receiver's public key (PuK$_R$), and the receiver's private key (PrK$_R$). The receiver typically selects a public key from a publicly available register of keys, and derives the private key from the public key through a transformation process known only to the receiver. Thus, the correlation between the public key and private key is generally secret and secure. Using the public key, the sending host 1502 encodes the message through encryptor/decryptor circuit 1506 to create an encoded message M'. Once encoded, only the appropriate private key can decode the message. Upon receiving the message, receiving host 1504 decodes the message M' with the private key to recover the original message M.

In one embodiment, encryptor/decryptor circuit 1507 in receiving host 1504 includes random number generator 1509 that employs any of the embodiments of FIGS. 2, 3, 6, 9, or 12. This technique ensures that the bit distribution from random number generator 1509 is sufficiently uniform and random so that there is no consistent correlation between private and public keys produced by receiving host 1504. As shown in network 1500, encryptor/decryptor circuit 1506 in sending host 1502 also includes random number generator 1508 that employs any of the embodiments of FIGS. 2, 3, 6, 9, or 12. This allows sending host 1502 to generate secure private keys and public keys when it employs public key transmission. A high degree of randomness is required in generating the key pair so as to make a non-exhaustive search of private keys exceedingly difficult.

In an alternative embodiment, network 1500 uses a single key (symmetric) system to perform cryptographic functions. In a single-key system, one key is used by both the sender to encrypt the message and by the receiver to decrypt the coded message. This system relies on the secrecy of the key. Therefore, a secure process is required for disclosure of the key only between the sender and receiver and no other party. For this embodiment, different keys are typically used for different message transactions. Thus, generation of the various keys requires a random process to ensure that a key used for one message transaction cannot be determined from any key used for any other message transaction. For this system the random number generators within the encryptor/decryptor circuits in each of the host computers of network 1500 are used to generate the random key patterns for encoding and decoding the message data transmitted between the host computers.

It should be noted that, although embodiments of the present invention have been discussed in relation to single key and public/private key encryption systems, embodiments of the present invention may be used for random number generation in other types of cryptographic systems for secure computer networking. Moreover, the encryptor/decryptor circuits illustrated in FIG. 15 may be used in a secure data transmission systems to perform various cryptographic functions such as coding and decoding of messages, authentication of transmitted messages, verification of digital signatures, and other such functions.

In the foregoing, a circuit has been described for producing a uniform duty cycle random number generator. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of producing a corrected bit stream from a random bit stream output of a random bit source, comprising:

comparing a pair of bits in the random bit stream with one another;

discarding the pair of bits if the pair of bits are identical;

accepting the pair of bits if the pair of bits are different;

discarding respective one of the pair of different bits based on an order of the different bit;

outputting non-discarded bit of the pair of bits when the pair of bits are different; and discarding every $X^{th}$ bit determined by a modulo-X count to reduce autocorrelation between bits.

2. The method of claim 1 wherein the discarding of the $X^{th}$ bit occurs after every pair of bits.

3. The method of claim 1 wherein said outputting the non-discarded bit of the pair of different bits includes outputting the first bit of the pair of bits.

4. The method of claim 1 wherein said outputting the non-discarded bit of the pair of different bits includes outputting the second bit of the pair of bits.

5. The method of claim 1 further comprising latching the pair of bits in the random bit stream in a pair of serially arranged latches.

6. The method of claim 1 wherein, outputting the non-discarded bit of the pair of different bits produces a uniform duty cycle output from the random bit source to use in a random number generator of a cryptographic system.

7. A duty cycle corrector circuit to generate a corrected bit stream from a random bit stream output of a random bit source, the duty cycle corrector circuit comprising:

a first storage circuit to receive and store a first bit of a pair of bits of the random bit stream;

a second storage circuit coupled serially to the first storage circuit to receive and store a second bit of the pair of bits;

a compare circuit coupled to the first storage circuit and the second storage circuit to compare the pair of bits to determine if the pair of bits are different;

validation logic circuit coupled to the first and second storage circuits and the compare circuit, the validation logic circuit to discard the pair of bits if the bits are the same, but to select respective one of the pair of bits based on the order of the bits, if the bits are different; and a timing circuit coupled to the validation logic circuit to discard every $X^{th}$ bit from the random bit stream determined by a modulo-X counter to reduce autocorrelation between bits.

8. The duty cycle corrector circuit of claim 7 wherein the first and second storage circuits include latches.

9. The duty cycle corrector circuit of claim 7 wherein the compare circuit includes an XOR gate to determine if the pair of bits are different.

10. The duty cycle corrector circuit of claim 7 further comprising an output circuit coupled to receive the bit stored in the first or second storage circuit as a corrected bit when the pair of bits are different.

11. The duty cycle corrector circuit of claim 10, wherein the output circuit comprises a storage circuit to store the corrected bit.

12. The duty cycle corrector circuit of claim 7 wherein the validation logic circuit operates under control of the timing circuit to discard every $X^{th}$ bit.

13. A computer comprising:

a network interface device operable to send and receive messages on a network medium; and an encryption/decryption circuit operable to encode and decode messages transferred on the network medium, said encryption/decryption circuit having a random number generator operable to produce a random bit stream, said random number generator comprising:

(a) a first storage circuit to receive and store a first bit of a pair of bits of the random bit stream;

(b) a second storage circuit coupled serially to the first storage circuit to receive and store a second bit of the pair of bits;

(c) a compare circuit coupled to the first storage circuit and the the second storage circuit to compare the pair of bits to determine if the pair of bits are different;

(d) validation logic circuit coupled to the first and second storage circuits and the compare circuit, the validation logic circuit to discard the pair of bits if the bits are the same, but to select respective one of the pair of bits based on the order of the bits, if the bits are different; and (e) a timing circuit coupled to the validation logic circuit to discard every $X^{th}$ bit from the random bit stream determined by a modulo-X counter to reduce autocorrelation between bits.

14. The computer of claim 13 wherein said encryption/decryption circuit is further operable to encode and decode messages transmitted and received on the network medium using a cipher-based cryptographic technique.

15. The computer of claim 14 wherein said cipher-based cryptographic technique is a single key system.

16. The computer of claim 14 wherein said cipher-based cryptographic technique is a public key/private key system.

* * * * *